United States Patent [19]

Alden et al.

[11] 4,234,886
[45] Nov. 18, 1980

[54] ELECTRIC GRAPHIC RECORDER

[75] Inventors: John M. Alden, Needham; George C. Williams, So. Easton, both of Mass.

[73] Assignee: Alden Research Foundation, Brockton, Mass.

[21] Appl. No.: 5,244

[22] Filed: Jan. 22, 1979

[51] Int. Cl.³ .................. G01D 15/06; G01D 15/24; G01D 15/26
[52] U.S. Cl. ............................. 346/165; 346/136; 346/145
[58] Field of Search .............. 346/165, 145, 101, 136, 346/153

[56] References Cited

U.S. PATENT DOCUMENTS

| 2,776,183 | 1/1957 | Alden ................................. 346/101 |
| 2,825,622 | 3/1958 | Cohen et al. ....................... 346/165 |
| 3,611,424 | 10/1971 | Alden ................................. 346/165 |
| 3,638,237 | 1/1972 | Alden ................................. 346/165 |
| 3,761,952 | 9/1973 | Simpkins ............................ 346/145 |
| 4,119,975 | 10/1978 | Alden ................................. 346/145 |
| 4,135,199 | 1/1979 | Kurland et al. ..................... 346/165 |

Primary Examiner—Daryl W. Cook
Attorney, Agent, or Firm—James H. Grover

[57] ABSTRACT

A graphic recorder including a viewable well for holding a recording web in a moist condition. The recorder includes a demountable, transparent well cover and a transparent top. Walls are arranged on the sides of the top and they carry a linear electrode and a roller and simultaneously urge the well cover towards the well to seal the compartment and prevent the escape of moisture.

7 Claims, 4 Drawing Figures

ELECTRIC GRAPHIC RECORDER

BACKGROUND OF THE INVENTION

This invention relates to graphic recorders and especially to recorders which utilize a moist roll of web to form a graphic image.

DESCRIPTION OF THE PRIOR ART

Electric graphic recorders are well known to the art and the use of a moist roll of recording web for such recorders has also been disclosed. Very frequently, such recorders have been rather large and placing a fresh roll of web in them has been cumbersome because the web must be moist while it is awaiting use. Several approaches have been utilized to keep the web moist and one of the more successful ways has been to enclose the roll in a disposable cassette that is sealed and retains the moisture. Such cassettes are disclosed, for example, in the U.S. Pat. to John M. Alden, No. 4,119,975. While the cassette is quite useful with electric graphic recorders, the cost of providing a disposable housing is rather high, relative to the cost of the web when considering the several fabricating operations that must be used to manufacture the cassette.

Such steps can be avoided if the component in the recorder that holds the web is constructed to avoid evaporation. Vapor tight constructions have been recognized by the art. For example, the U.S. Pat. to Simpkins, No. 3,761,952 discloses a recorder in which the roll of recording web is stored in a compartment that is covered with a hinged plate. To change a roll the operator raises the cover of the recorder and then raises the plate to expose the compartment to insert a fresh roll. The use of the hinged plate provides certain advantages over older techniques of having the recorder cover simultaneously seal the compartment and cover the recording equipment. In that type of equipment, such as disclosed for example in the U.S. Pat. to Milton Alden, No. 3,638,237, each time the cover was opened the compartment was exposed. If the web jammed in the web path, the cover had to be opened to free the jam. Moisture would then evaporate from the web and reduce the quality above the recorded image. While the device disclosed in the above mentioned patent to Simpkins provides positive sealing of the web compartment to prevent the escape of moisture, in order to check the equipment to determine if the roll was spent, the operator had to lift the recorder cover and then lift the compartment cover also.

STATEMENT OF THE INVENTION

According to the present invention we have provided an improvement in graphic recorders of electrical signals which utilize a moist recording web drawn on a path from a roll to a recording zone between a scanning and a linear electrode. The recorder includes a frame and a well disposed within the frame for holding the web and a transparent cover that is demountably disposed over the well and arranged to form a humidor which retains moisture in the roll. The roll is disposed within the well and arranged so that the axis of the roll is aligned substantially parallel to the linear electrode. A mouth is formed between the well and the well cover for the emergence of the moist web. A pair of polymeric strips are disposed on the mouth for containing the moisture within the well. The moist web slides between the polymeric strips to form a vapor barrier. A recorder cover including a transparent top and side walls attached to the top is disposed upon the frame and preferably attached with a hinge. The sidewalls engage the well cover and urge the well cover against the well. They also are used to support the linear electrode and a roller that draws the recording web through the recording zone from the well. When the recorder top is raised, the linear electrode and the roller are raised simultaneously, thereby allowing an operator to work upon the equipment easily if a malfunction arises, without removing the well cover which would allow moisture to escape.

DESCRIPTION OF THE PREFERRED EMBODIMENTS

Figure 1:
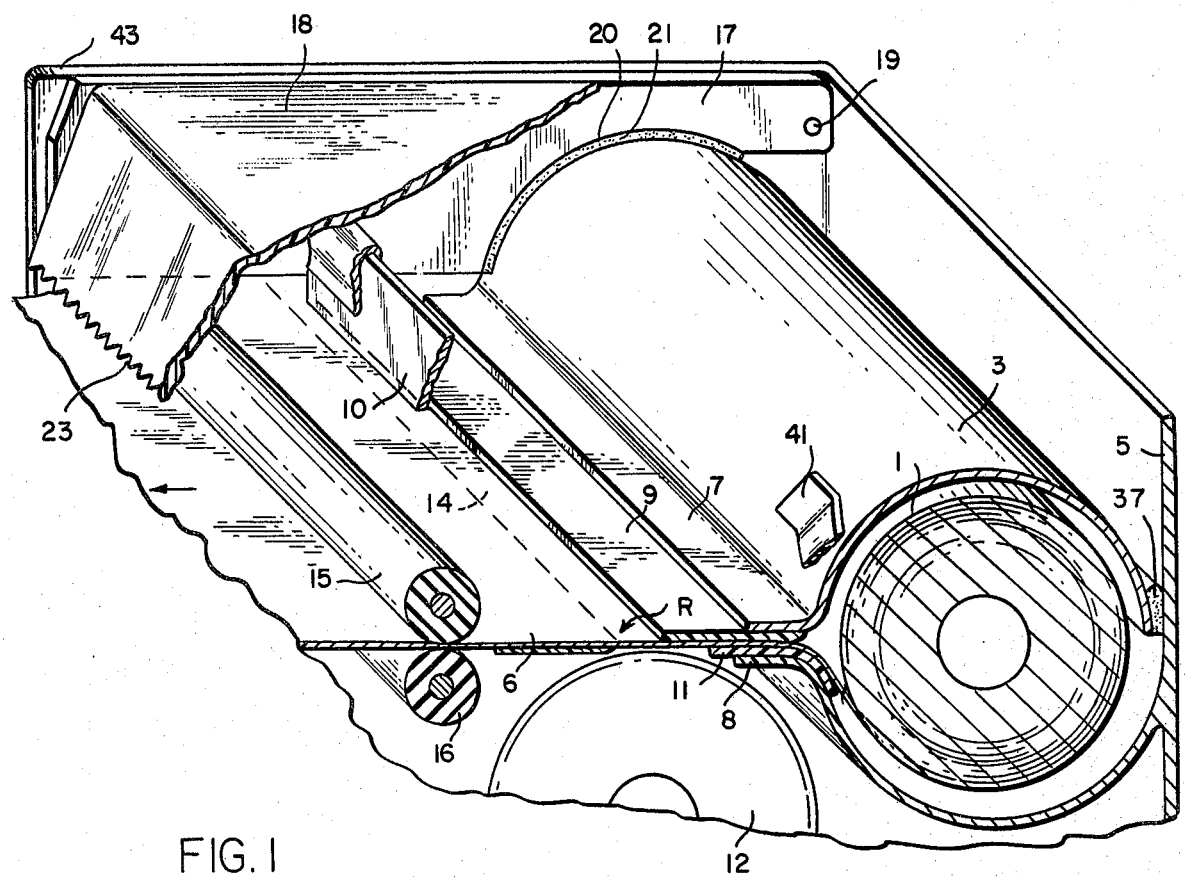
FIG. 1 is an isometric view, partially broken away, of the graphic recorder of the present invention.

Referring now to FIG. 1, a roll of recording web 1 is disposed within a compartment formed by a well 2 and a well cover 3. The rear portion of well cover 3 fits against rear wall 5 and is supported in that position as will be described later. The forward portion of well cover 3 terminates in a mouth from which the web of recording paper 6 emerges. A pair of lips 7 and 8 extend from the mouth and provide a path for the paper. A strip 9 of polymeric material is attached to the lip 7 of the well cover and shields the web of recording paper 6 until it contacts linear electrode 10 to prevent drying. The web of recording paper 6 is supported by a second strip of polymeric material 11 which extends from the lip 8 and the two strips 9 and 11 cooperate to form the vapor seal for the compartment. Preferably, linear electrode 10 is disposed immediately at the end of polymeric strip 9 when the cover is down so that the web 6 does not travel any substantial distance before it enters a recording zone R.

An image is formed upon the web 6 of recording paper by well known techniques as it travels through the recording zone R between linear electrode 10 and a scanning electrode 12. Scanning electrode 12 is preferably a revolving drum that has a helically disposed eletrode 14 mounted on the surface. The image forming technique involves passing metal ions into a recording medium in a selective pattern, the metal ions being released from the eroding of linear electrode 10 by passage of current therethrough. The ions migrate into the recording medium forming colored marks with the marking compound.

The web upon which the graphic information has been recorded then passes between a pair of rollers 15, 16, the roller 16 being driven synchronously to the revolving drum 12 and the roller 15 being an idler. Rollers 15, 16 serve to draw the web 6 from the well through the recording zone R.

A recorder cover including sidewalls 17 (only one shown) and transparent top 18 is hinged to the frame of the recorder at 19. Linear electrode 10 and roller 15 are supported by the side walls 17 and both are simultaneously removed from contact with the web of recording paper 6 when the top 18 is raised. A shoulder 20 is formed in the side wall 17 and generally conforms to the external configuration of well cover 3. A strip 21 of foamed polymeric material is disposed between the shoulder 20 and the well cover 3 and is compressed when top 18 is disposed in a closed position. Another strip 37 of foamed polymeric material is disposed between the outside of well cover 3 and rear wall 5 of the recorder and seals the moisture into the web-holding compartment.

In the preferred embodiment, both top 18 and well cover 3 are transparent so that the operator of the device can view the compartment which holds the recording web to see if an adequate supply remains for receiving messages. Well cover 3 is entirely demountable and can be completely removed from the recorder after the top 18 has been lifted thereby providing easy access for the operator to the web holding compartment. A serrated edge 23 is provided on the top 18 so as to enable the operator to tear off the recorded image from the web.

Figure 2:
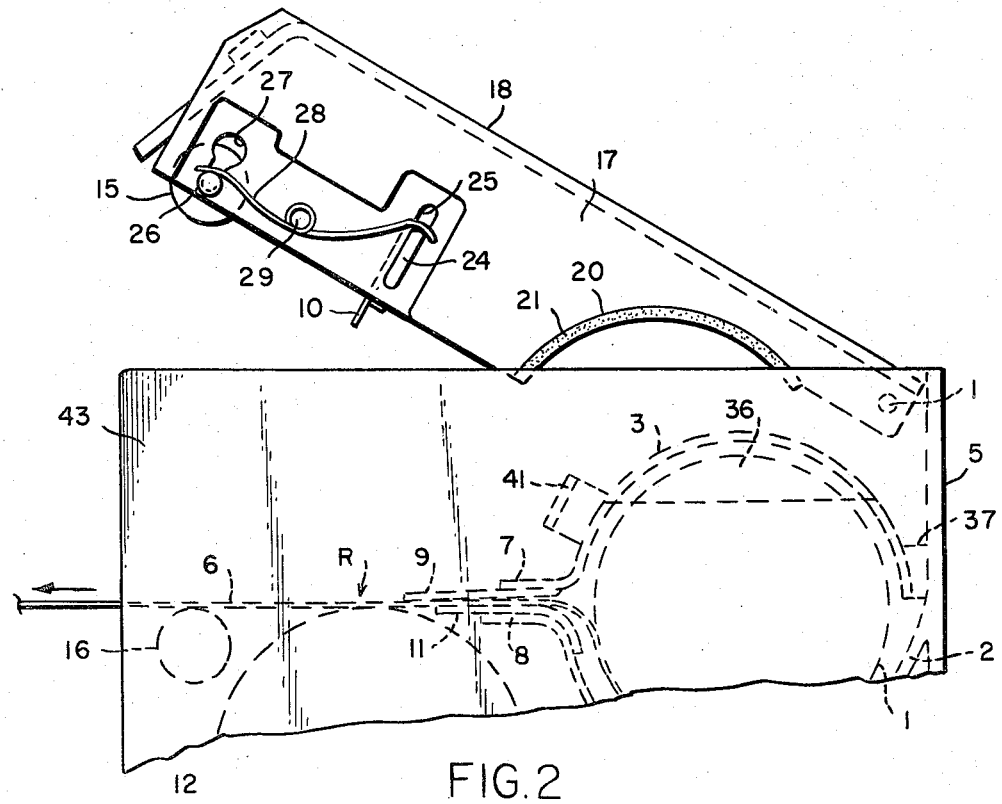
FIG. 2 is the side view of the graphic recorder with the cover raised.

Referring now to FIG. 2, the top of the recorder has been raised and the shoulder 20 formed in side wall 17 has been disengaged from well cover 3. The linear electrode 10 is carried by a retainer 24 which is slidably housed in a slot 25. A shaft 26 within idler roller 15 is slidably housed in a slot 27. Idler roller 15 bears against driven roller 16 when the top 18 of the recorder is lowered. A spring 28 pivots at 29 and urges the shaft 26 of roller 15 and the retainer of linear electrode 10 towards the web of recording paper 6. When lowered, linear electrode 10 will just touch the lead edge of strip 9 so that substantially no moisture will evaporate before web 6 enters the recording zone R. As shown, the web 6 of recording paper can be easily removed from the compartment formed by well 2 and well cover 3 simply by lifting well cover 3 by handle 4. The strip 9 is attached to the well cover 3 and is removed at the same time, thereby exposing the roll of recording web. Both the linear electrode 10 and the idler roller 15 are carried by side walls 17 and thus side walls 17 perform the threefold purpose of sealing the web holding compartment, carrying the linear electrode and also carrying the idler roller.

Figure 3:
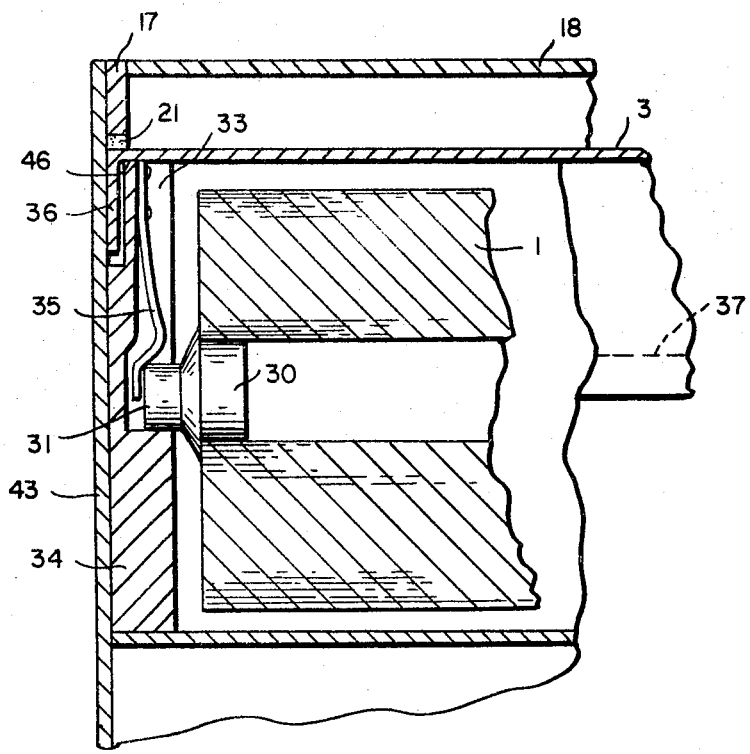
FIG. 3 is a fragmentary view illustrating the well and well cover that houses the roll of recording web.

As shown in FIG. 3, the roll of recording web 1 is supported by an axially disposed retainer 30 that is fitted into the core. A projecting shaft 31 extends from the retainer 30 and fits into a recess 33 formed in compartment side wall 34. A second compartment side wall (not shown) is disposed upon the opposite side of the web holding compartment. The bottom of recess 33 is aligned with the bottom of a second recess in the unshown compartment side wall so as to place the axis of the roll 6 parallel to the linear electrode when the top is closed. A retaining spring 35 holds the projecting shaft 31 in place within recess 33 and can be deformed by squeezing to allow for insertion of a new roll. Support for cover 3 is provided by shoulder 46 that forms the top of compartment side wall 34 and moisture seal is accomplished through strip 21. A side wall 36 is disposed upon the end of well cover 3, and fits into a recess formed between compartment side wall 34 and frame 43.

Figure 4:
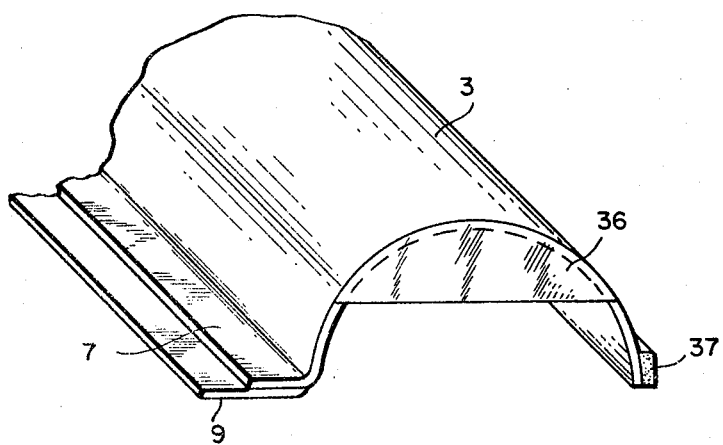
FIG. 4 is a front view of the well cover, partially broken away.

As seen in FIG. 4, the side wall 36 is formed so as to span across the well cover 3 and provide for lateral support and enhance the retention of moisture. A strip of foamed polymeric material 37 is disposed at the rear of cover 3 so as to prevent evaporation between the end wall and the well cover. The strip of polymeric material 9 is disposed upon the mouth of the well cover 3 also to insure the retention of moisture as discussed previously.

It is apparent that modifications can be made within the spirit and scope of the present invention. But it is our intention, however, only to be limited by the appended claims.

We claim:

1. A graphic recorder of electrical signals on a moist recording web drawn on a path from a roll to between a scanning electrode and a linear electrode; said recorder comprising:
  a frame and a well disposed upon said frame for holding said moist recording web;
  a cover demountably disposed over said well and arranged to form a humidor and retain moisture in the roll;
  means for holding the roll of recording web in said well, said means being arranged so that the axis of the roll is aligned parallel to the linear electrode;
  a mouth formed between said well and said well cover for the emergence of moist web and means on said mouth for retaining moisture within said well; and
  a recorder cover hinged to the frame, and means on the recorder cover positioned to engage the well cover to urge the well cover to a position sealing the humidor well.

2. The recorder according to claim 1 wherein the means on the mouth for retaining moisture includes a pair of opposed polymeric strips that extend respectively from said well cover and from said well and are arranged to slidably engage said recording web.

3. The recorder according to claim 1 further including a recorder cover disposed upon said frame, said recorder cover including a top and sidewalls.

4. The recorder according to claim 1 further including said linear electrode and a roller being supported between said sidewalls, whereby when said recorder cover is raised, said linear electrode and said roller is raised and said well cover is released from engagement with said sidewalls.

5. The recorder according to claim 4 wherein said well and said well cover are each semi-cylindrical and said sidewalls have recesses disposed therein adapted to receive the well cover and urge said well cover towards said well.

6. The recorder according to claim 1 wherein the recorder cover and the well cover are transparent.

7. The recorder according to claim 4 wherein strips of moisture sealing material are disposed on the rear of the well cover and between the sidewalls and the well cover to retain moisture within the well.

* * * * *